Aug. 3, 1937. E. G. BEIDERMAN 2,089,013
WELDING TOOL
Filed Aug. 1, 1935

INVENTOR.
EDWARD G. BEIDERMAN
BY Barnes, Kisselle, Laughlin & Raisch
ATTORNEYS.

Patented Aug. 3, 1937

2,089,013

UNITED STATES PATENT OFFICE 2,089,013

WELDING TOOL

Edward G. Beiderman, Detroit, Mich., assignor to General Motors Corporation, Detroit, Mich., a corporation of Delaware Application August 1, 1935, Serial No. 34,130

6 Claims. (Cl. 219—4)

The tool which is the subject matter of this application is believed to represent a departure in previous and current welding practice. It involves a combination between spot welding and full bar welding and, accordingly, we call it a semi-bar welder.

In the usual spot welding practice, the tool or machine has two welding points which are connected with cables or conductors that lead through the machine or tool. In bar welding, the tool has no conductors but simply uses an electric bridge between the two conductors which are entirely separate from the tool.

It is the object of the present tool to provide a tool which has one flexible conductor and which is arranged to operate on work that lies on a conductor. This tool is arranged also to bear against a solid backing beam, which is, however, not a conductor. This tool has some advantages in some situations over a full bar welder, as it eliminates the necessity of the large flexible bridging conductor from one contact on the tool to the other contact and the necessity of insulating both contacts and the conductor from the other operating parts of the tool. It eliminates one large copper conducting rail. The tool construction is simplified, insulating problems are minimized, and for some purposes, the tool answers the purpose as well, or better, than a bridging tool.

Figures 1, 2:
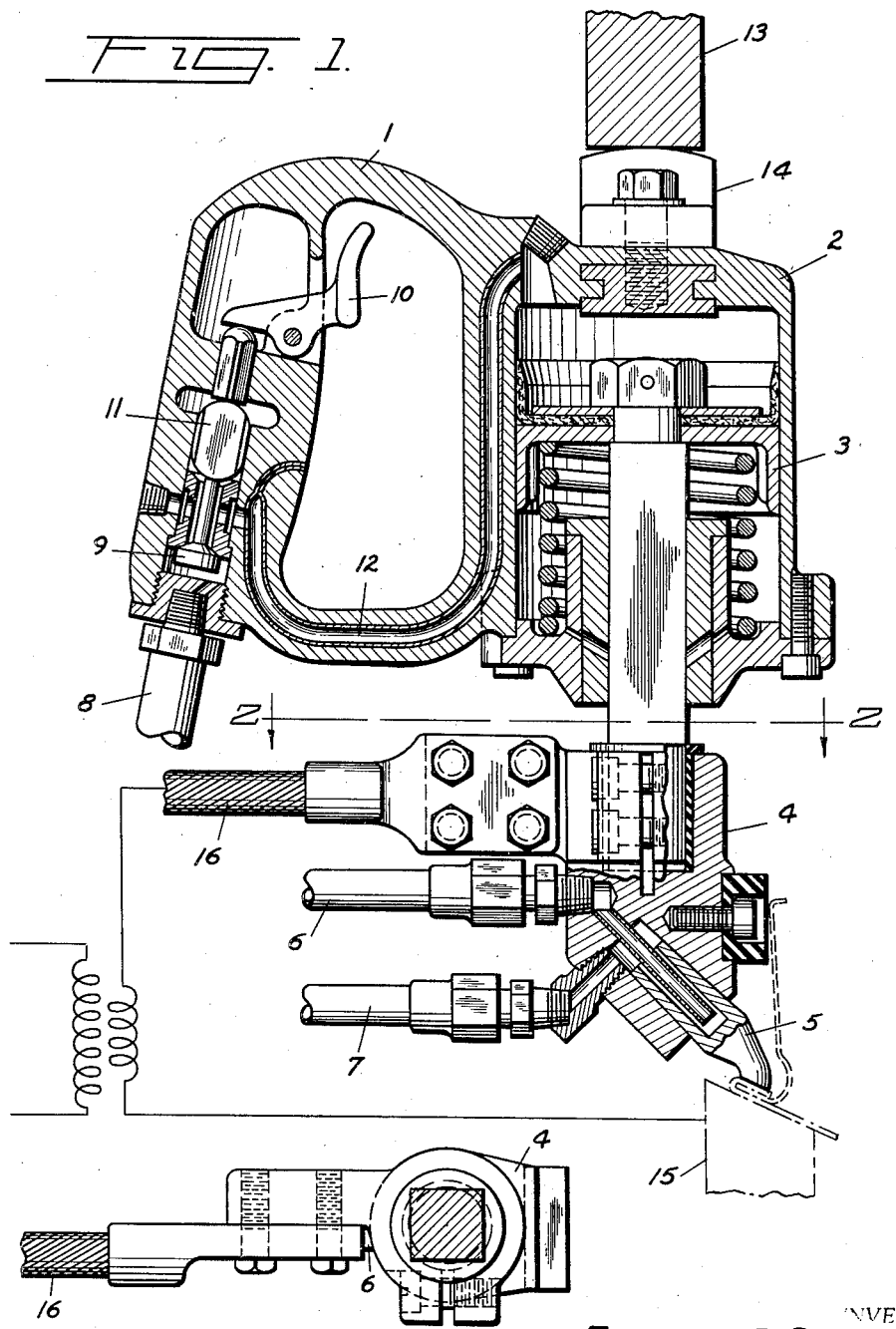
Fig. 1 is a section through the tool.
Fig. 2 is a section taken on the line 2—2 of Fig. 1.

1 is the frame of the tool, preferably constructed of aluminum. 2 is the cylinder which reciprocates the piston 3 which carries a copper head 4 into which is driven the tapered welding point 5. The head and the welding point are water cooled by water circulating through the pipes 6 and 7. The air is delivered through a pipe 8. An intake valve 9 is ordinarily held on its seat by the air pressure but may be released from its seat by rocking the trigger 10 which pushes on the exhaust valve 11 closing this and at the same time opening the intake valve so that air passes through the passageway 12 to the chamber of the air cylinder.

Above the tool is located a steel backing beam or rail 13. The purpose of this is to contact with the block 14 on the top of the tool and serve to hold the tool from rising as the piston forces the welding point 5 against the work and against the conductor bar 15. A cable 16 supplies the current to the copper head 4 and thence to the welding point. It then passes through the work and into the conductor bar 15.

Obviously the parts could be re-arranged so that the tool is made to contract on the uncharged beam and the work and the charged rail in place of the expanding arrangement that I have shown in the drawing, hence, I desire it to be understood that my claims be read to cover both these forms. The idea here is to use one conductor which is flexible and attached to the tool and the other conductor which is in the form of a bar or supporting cable of copper upon which the work lies and a second bar or beam which acts to support the tool while the welding electrode thereof is being forced against the work lying on the conducting bar. This I believe to be new and it involves a very considerable saving in the cost of the unit for these heavy copper rails, together with their connections with the transformer, are very expensive.

What I claim is:

1. A system of semi-bar welding comprising an electric conducting rail on which the work is to be laid, an electrically uncharged beam acting as a backing, a tool provided with an electrode and having an electric cable connection with the electrode, the tool being arranged to bear on the backing beam and having a fluid operated piston connected with but insulated from the electrode to engage the electrode against the work on the conducting rail.

2. A system of semi-bar welding comprising an electric conducting rail on which the work is to be laid, an electrically uncharged beam acting as a backing, a tool provided with an electrode and having an electric cable connection with the electrode, the tool being arranged to bear on the backing beam and engage the electrode against the work on the conducting rail, and means within the tool but insulated from the electrode to force the tool against the non-conducting beam and thereby force the electrode on to the work bearing against the conducting rail.

3. A system of semi-bar welding comprising a conducting rail on which the work is to be laid, an electrically uncharged beam acting as a backing, a tool provided with an electrode and having an electric cable connection with the electrode, said tool provided with a portion insulated from the electrode, the tool being arranged to have the insulated portion bear on the backing beam and engage the electrode against the work on the conducting rail, and expansive means within the tool to force the tool against the non-charged beam and thereby force the electrode on to the work bearing against the conducting rail.

4. A system of semi-bar welding comprising a conducting rail on which the work is to be laid, an electrically uncharged beam acting as a backing, a tool provided with an electrode and having an electric cable connection with the electrode, the tool having an insulated portion arranged to bear on the backing beam and arranged to engage the electrode against the work on the conducting rail, and pneumatically operated means within the tool to force the tool against the uncharged beam and thereby force the electrode on to the work bearing against the conducting rail.

5. In a system of semi-bar welding, the combination of two bars spaced apart, one of the bars arranged to have work lie thereon and this bar being a conductive bar, the other bar being an electrically uncharged beam, a tool having an insulated portion adapted to bear against the uncharged beam and another portion in the form of an electrode, an air controlled piston carrying said electrode and a flexible cable connected to the said electrode for carrying current thereto, and a handle for said tool.

6. In a system of semi-bar welding, the combination of two bars spaced apart, one of the bars arranged to have work lie thereon and this bar being a conducting bar, the other bar being an electrically uncharged beam and a tool having a portion adapted to bear against the beam and another portion in the form of an electrode, an air controlled piston carrying said electrode and a flexible cable connected to the said electrode for carrying current thereto, a handle for said tool provided with a trigger controlled exhaust and inlet valve.

EDWARD G. BEIDERMAN.